(No Model.)

E. KIPPER & E. W. PERRY, Jr.
MAGAZINE PLATE HOLDER FOR PHOTOGRAPHIC APPARATUS.

No. 439,012.  Patented Oct. 21, 1890.

Witnesses.

Inventors.
Emil Kipper.
Enoch Wood Perry Jr.
By James L. Norris
Atty.

THE NORRIS PETERS CO., PHOTO-LITHO., WASHINGTON, D. C.

UNITED STATES PATENT OFFICE.

EMIL KIPPER, OF ADAMS, MASSACHUSETTS, AND ENOCH WOOD PERRY, JR., OF NEW YORK, N. Y.

MAGAZINE PLATE-HOLDER FOR PHOTOGRAPHIC APPARATUS.

SPECIFICATION forming part of Letters Patent No. 439,012, dated October 21, 1890.

Application filed April 28, 1890. Serial No. 349,751. (No model.)

*To all whom it may concern:*

Be it known that we, EMIL KIPPER, a subject of the Emperor of Germany, but who has declared his intention of becoming a citizen of the United States, residing at Adams, in the county of Berkshire and State of Massachusetts, and ENOCH WOOD PERRY, Jr., a citizen of the United States, residing at New York, in the county of New York and State of New York, have invented new and useful Improvements in Magazine Plate-Holders for Photographic Apparatus, of which the following is a specification.

Our invention relates to magazine plate-holders for photographic apparatus, and the purpose thereof is to do away with the envelope or non-actinic backing heretofore used upon each of the films when stacked in a series.

To this end our invention consists in so arranging and manipulating the sensitized films that they may be separately withdrawn from the plate magazine or holder and removed to a wholly separate chamber, where they are exposed successively, and finally removed to the back of the latter chamber or other suitable point of storage to be stored until they are developed.

To enable others skilled in the art to practice our said invention, we will proceed to describe the same in connection with the accompanying drawings, in which—

Figure 1:
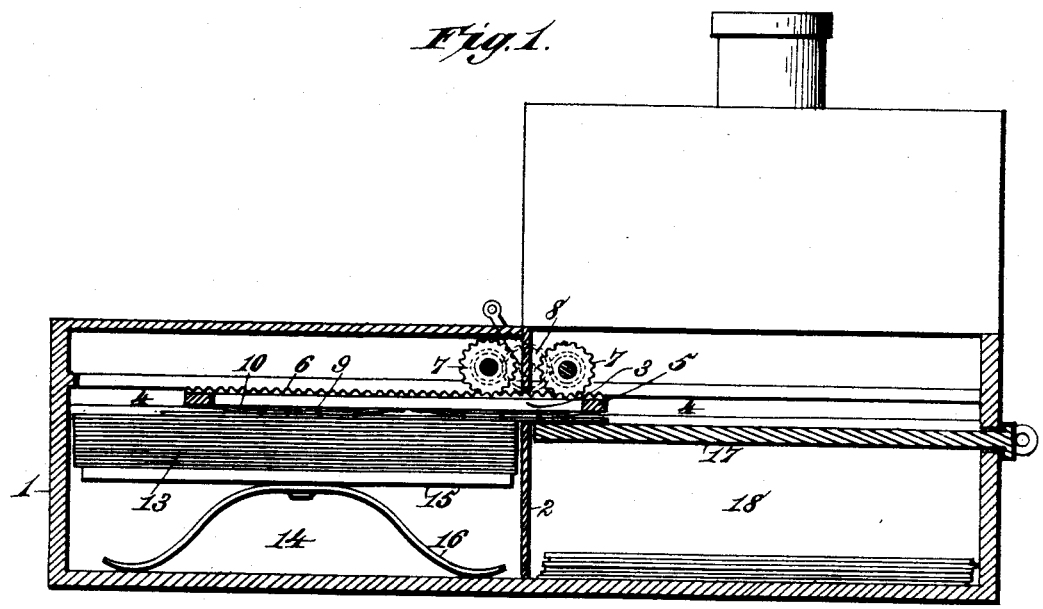
Figure 2:
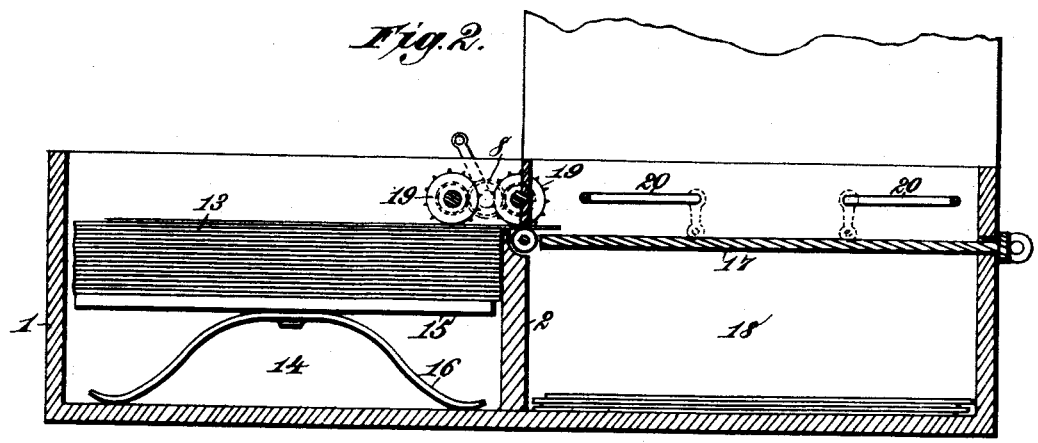
Figure 3:
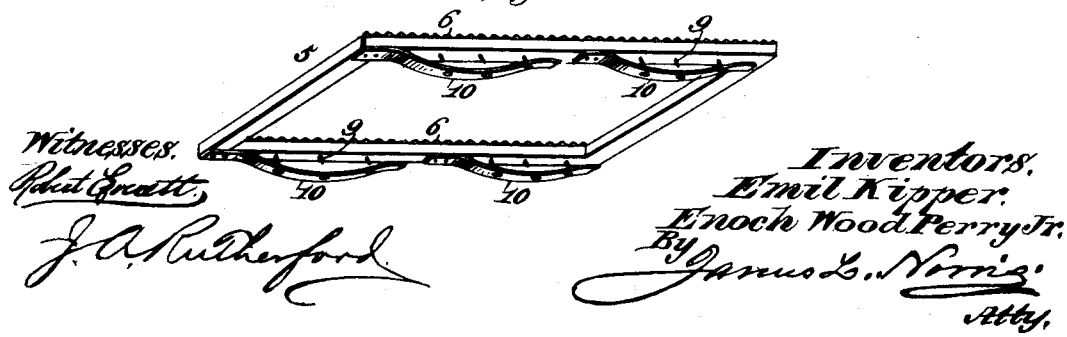

Figure 1 is a horizontal section showing our invention. Fig. 2 is a similar section showing a modified construction. Fig. 3 is a detailed perspective view of the sliding frame.

In the said drawings, the reference-numeral 1 denotes the magazine plate-holder of a photographic camera, having, as in our former inventions, a partition 2, dividing the exposing-chamber from the magazine or storage chamber. In this partition is formed a slot or channel 3 throughout the same. Within this slot and moving in guideways 4 is a rectangular frame 5, having gear-teeth 6 upon two parallel surfaces, as shown in Fig. 3. With these toothed racks are meshed gears 7—one upon each side of the partition 2—and operated by an intermediate 8, which meshes with pinions on the shafts of both gears, or a single wheel upon one side of the partition may be used.

Upon the lower surfaces of two parallel parts of the frame 5 are mounted or formed points or other suitable devices 9, adapted to engage the outer face of the sensitized film adjacent to said frame. At suitable points along each toothed surface also are mounted leaf-springs 10, their free ends being turned or curved toward the frame.

The sensitized films 13 are stacked in the magazine-chamber 14, and are fed outward or forward by a pressure-plate 15, actuated by a spring 16 or other suitable means, whereby they are pressed against the toothed surfaces of the frame.

Just in the plane of the rear edge of the slot 3 is arranged a slide 17, which incloses a storage-chamber 18 in the rear of the slide, the latter being operated from the outer end of the storage box or chamber or by connection with the frame 5. The camera and lens are connected with the latter in any suitable manner.

The films or plates are drawn successively from the storage-chamber by the frame 5, the points or teeth thereon engaging the outer faces of said plates, and they are drawn directly over the outer face of the slide 17 into position for exposure, after which, the slide being withdrawn, the springs 10 throw the plate off the points or other devices 9 and push it back into the receiver or storage-chamber. The gear-teeth may be placed on any of the sides of the frame.

We may use either the teeth, points, or other devices, or we may use pivoted lips or other similar devices which swing in one direction to pass over the faces of the plates and are rigidly held in the other direction to engage the face or to drop immediately behind the edge of the glass plates, if such are used, and draw the same forward.

We may substitute for the devices last set forth wheels 19, one of which is journaled in or partly in each chamber on opposite sides of the partition 2. These wheels are provided with peripheral points, pins, or teeth of any suitable form, by which they will engage the surface of the outer plate. They are duplicated on each side of the camera-box and driven by an intermediate like the one shown in Fig. 1. In this modification we use the slide shown in Fig. 1; but in place of the leaf-springs on the frame we pivot a bail 20, having a crank-arm, whereby the plate may be disconnected from the teeth of the wheels 19 and pressed back in the storage-chamber. If glass plates are used, as above, the edges of the same should be covered with paper, &c., so that the teeth of the wheels may engage therewith.

It will be readily seen that by this invention a series of plates having non-actinic backing may be exposed successively and removed to a storage-chamber or plate-holder, where it may be kept without injury.

We do not herein broadly claim the combination, with a camera-box, of a stacking-chamber for the sensitized films, a storage-chamber for the exposed films, an exposing-chamber, and means for positively moving and transferring the films from the stacking-chamber to the exposing-chamber and thence to the storage-chamber, as such constitutes the subject-matter of our application, Serial No. 349,752, filed of even date herewith.

What I claim is—

1. In a photographic apparatus, the combination, with a storage-chamber or magazine-chamber, of a stack of spring-pressed plates, means for shifting said plates, the latter having no envelopes or non-actinic casings successively from the closed storage-chamber to an adjacent chamber, a lens for exposing said plates, a slide in front of which said plates are exposed, and a chamber in rear of said slide to receive the exposed plates, said chamber being entirely closed, substantially as described.

2. In a magazine plate-holder, the combination, with a movable transferring-frame, of a movable slide, the former transferring a series of plates without non-actinic envelopes from one closed box to another, an adjacent chamber, means for feeding or reciprocating the transferring-frame, devices whereby the plates adhering thereto shall be detached therefrom, and a chamber having its front closed by said movable slide-plate, substantially as described.

3. In a photographic apparatus, the combination, with a magazine plate-holder, of a device for feeding the stacked plates or films, a slide-frame having teeth, points, or other suitable devices for transferring the plates successively, a storage-chamber in which said plates are arranged in front of the feeding device, an adjacent exposing-chamber to which the films are transposed by the sliding frame, a movable slide separating the exposure-chamber from a plate-holding chamber in rear thereof and forming a support for the plate-receiving exposure, and means for disengaging the plates successively from the transferring device when the movable slide is withdrawn, substantially as described.

4. In a photographic apparatus, the combination, with a storage-chamber and an adjacent receiving-chamber or plate-holder divided by a partition having a communicating opening, of a transferring device, a movable slide closing the storage-chamber and separating it from an exposing-chamber immediately in front thereof, and means for feeding forward a stack or series of sensitized plates, the plates being brought from the storage-chamber into the exposure-chamber and thence into the plate-holding chamber, substantially as described.

5. In a magazine plate-holder, the combination, with a chamber having a movable slide against which the plates are successively exposed, of a transferring-frame, means for operating the same, and a disengaging device separating the films from the transferrer, substantially as described.

In testimony whereof we have affixed our signatures in presence of two witnesses.

EMIL KIPPER.
  ENOCH WOOD PERRY, Jr.

Witnesses:
 C. SEDGWICK,
 H. KRONFELD, Jr.